United States Patent
Valeriano et al.

(10) Patent No.: US 7,621,335 B2
(45) Date of Patent: Nov. 24, 2009

(54) VISCOSITY BREAKER FOR POLYACRYLAMIDE FRICTION REDUCERS

(75) Inventors: Oscar L. Valeriano, Odessa, TX (US); Richard J. Dyer, Midland, TX (US)

(73) Assignee: Chemplex, Ltd., Snyder, TX (US)

(*) Notice: Subject to any disclaimer, the term of this patent is extended or adjusted under 35 U.S.C. 154(b) by 0 days.

(21) Appl. No.: 11/756,293

(22) Filed: May 31, 2007

(65) Prior Publication Data

US 2007/0284101 A1    Dec. 13, 2007

Related U.S. Application Data

(60) Provisional application No. 60/811,740, filed on Jun. 8, 2006.

(51) Int. Cl.
*E21B 43/26* (2006.01)
(52) U.S. Cl. .............. 166/308.2; 166/283; 166/300; 166/308.3
(58) Field of Classification Search ............... None
See application file for complete search history.

(56) References Cited

U.S. PATENT DOCUMENTS

| | | | |
|---|---|---|---|
| 3,442,803 A | 5/1969 | Hoover et al. | |
| 3,818,991 A | 6/1974 | Nimerick | |
| 4,144,179 A | 3/1979 | Chatterji | |
| 4,234,433 A | 11/1980 | Rhudy et al. | |
| 4,506,734 A | 3/1985 | Nolte | |
| 4,552,675 A | 11/1985 | Brown et al. | |
| 5,187,011 A * | 2/1993 | Manalastas et al. | 428/402.24 |
| 6,983,801 B2 | 1/2006 | Dawson et al. | |
| 2005/0227874 A1 | 10/2005 | Berger et al. | |
| 2007/0125536 A1* | 6/2007 | Acock et al. | 166/280.2 |

OTHER PUBLICATIONS

Carman, P. S. and Cawiezel, K. E., Successful Breaker Optimization for Polyacrylamide Friction Reducers Used in Slickwater Fracturing, Jan. 2007, pp. 1-9, Society of Petroleum Engineers, United States.

* cited by examiner

*Primary Examiner*—Zakiya W. Bates
(74) *Attorney, Agent, or Firm*—Locke Lord Bissell & Liddell, LLP

(57) ABSTRACT

A well treating fluid useful in slickwater fracturing processes contains polyacrylamide friction reducer and a viscosity breaker capable of reducing the viscosity of the well treating fluid to about the viscosity of water at ambient temperatures of typical underground formations. The viscosity breaker is selected from the group consisting of hydrogen peroxide, calcium peroxide, magnesium peroxide, and zinc peroxide and is present in an amount above about 0.002% by weight.

12 Claims, No Drawings

VISCOSITY BREAKER FOR POLYACRYLAMIDE FRICTION REDUCERS

CROSS REFERENCE TO RELATED APPLICATIONS

This application claims priority to U.S. Provisional Application No. 60/811,740 filed on Jun. 8, 2006, which is entitled "Viscosity Breaker for Polyacrylamide Friction Reducers."

BACKGROUND OF THE INVENTION

1. Field of Use

The invention relates to the use of polyacrylamide friction reducers and more particularly to the use of selected peroxides to break down the viscosity of the polyacrylamide friction reducers when friction reduction is no longer required.

2. Related Art

In the petroleum industry it is an increasingly common practice to perform a procedure known as a slickwater fracturing. This is a method of stimulating the production of hydrocarbons from a well by pumping water at high rates into the well, thus creating a fracture in the productive formation. Practical and cost considerations for these treatments require the use of materials to reduce pumping pressure by reducing the frictional drag of the water against the well tubulars. Polyacrylamide polymers are very widely used for this purpose.

One ongoing problem with the use of these polymers is their persistence. A large fraction of the polyacrylamide used in a slickwater treatment frequently stays within the producing formation. This has several ill effects on the desired goal of stimulating production: the polymer residue may actually plug some of the permeability of the rock; it may hinder recovery of the water used in the fracturing treatment; and it provides a source of nitrogen that can support the growth of bacteria in the well. Polyacrylamide that is not absorbed but that remains in solution in recovered water will also make disposal of that water more difficult.

A number of strategies have been used to deal with this problem. Chatterji in U.S. Pat. No. 4,144,179 teaches the use of organic peroxides in connection with a reducing agent in order to break up a well treatment fluid containing an organic gelling agent. Dawson in U.S. Pat. No. 6,983,801 teaches the use of esters and/or crosslinkers in connection with a breaking agent to break down the viscosity of a hydratable polymer in a well treating fluid. However, there is still a need for a viscosity breaker for a well treatment fluid that contains a polyacrylamide friction reducer.

SUMMARY OF THE INVENTION

A well treating fluid useful in slickwater fracturing processes contains polyacrylamide friction reducer and a viscosity breaker capable of reducing the viscosity of the well treating fluid to about the viscosity of water at ambient temperatures of typical underground formations. The viscosity breaker is selected from the group consisting of hydrogen peroxide, calcium peroxide, magnesium peroxide, and zinc peroxide and is present in an amount above about 0.002% by weight.

DESCRIPTION OF THE PREFERRED EMBODIMENTS

The inventors have discovered that polyacrylamides of the type used in slickwater fracturing can be degraded to the point of having a viscosity about that of water by agents selected from the group of hydrogen peroxide, calcium peroxide, magnesium peroxide, and zinc peroxide. The metal peroxides may be encapsulated as taught in U.S. Pat. No. 4,506,734. Loadings of as low as 0.002% by weight of solution of these materials has been found to destroy the viscosity of polyacrylamide solutions within a few hours at room temperature without interfering with the friction reduction properties required of the polymers within the minutes after mixing the agents. Only a very few minutes of effective friction reduction are required or even desirable in slickwater fracturing treatments. The agents of this invention are effective without the addition of supplemental reducing agents and/or crosslinkers.

In a preferred embodiment hydrogen peroxide is added at a concentration of about 0.004%, to a well treating fluid containing fresh water and about 0.01% polyacrylamide. For ease of handling the hydrogen peroxide is preferably added as a 7% solution and the polyacrylamide is added as about a 32% emulsion. The well treating fluid may optionally contain other additives such as surfactants, scale inhibitors, and microbiocides. However, the well treating fluid does not contain any water soluble transition metal salts, esters, cross-linking compounds, or free radical scavengers. The viscosity of the above well treating fluid, which has an initial viscosity of about 2-5 centipoise, returns to the approximate viscosity of water, which is about 0.79 centipoise, within about 18 hours at a temperature of about 90° F.

Various embodiments of the current invention may be better understood by reference to the following examples. All viscosities were measured in the form of flow times through a Cannon-Fenske viscometer, which is a piece of glassware in which a precisely repeatable volume of fluid is allowed to flow through a length of fine capillary tubing. The time taken for this flow is recorded and compared with the time taken by a fluid of known viscosity. The Cannon-Fenske viscometer was selected because electromechanical instruments are much less accurate in these low ranges. The testing was conducted at 90° F. at which the viscosity of water is 0.79 centipoise. This corresponds to a time of 145 seconds through the particular Cannon-Fenske viscometer used here.

EXAMPLE 1

A well treating fluid was produced by adding 0.33 gallons of the polyacrylamide emulsion sold as "PLEXSLICK 961," which is manufactured by Cytec Industries of North Carolina per 1000 gallons of fresh water. This corresponds with about 0.01% weight percent of polyacrylamide. For sample A, 1.0 gallon per 1000 gallons of the 7% hydrogen peroxide solution disclosed above was added immediately to the well treating fluid prior to the start of testing. This corresponds to about 0.007% by weight of hydrogen peroxide in the well treating fluid. For Sample B, 0.5 gallons per thousand gallons of the 7% hydrogen peroxide solution was added immediately to the well treating fluid prior to the start of testing. This corresponds to about 0.0035% by weight of hydrogen peroxide in the well treating fluid. For Sample C, 0.33 gallons of the 7% hydrogen peroxide solution was added immediately to the well treating fluid prior to the start of testing. This corresponds to about 0.002% by weight of hydrogen peroxide in the well treating fluid. For each sample, the fresh solution was transferred to the viscometer and its viscosity was measured at the intervals noted in the table. The viscosities are reported in the number of seconds it took to pass through a Cannon-Fenske viscometer. Times through this Cannon-Fenske viscometer can be converted to centipoise by multiplying the time by 0.00545.

TABLE 1

| Time | Sample A | Sample B | Sample C |
|---|---|---|---|
| Initial | 186 | 183 | 185 |
| 1 hour | 175 | 172 | 176 |
| 2 hours | 170 | 166 | 166 |
| 4 hours | 165 | 160 | 166 |
| 6 hours | 160 | 155 | 160 |
| 18 hours | 146 | 149 | 153 |

EXAMPLE 2

A well treating fluid was produced according to the method described in Example 1 except that the 0.5 gallons of the polyacrylamide emulsion sold as ""PLEXSLICK 961," which is also manufactured by Cytec Industries was added per 1000 gallons of fresh water. This corresponds with about 0.0175% by weight of polyacrylamide. For sample D, 1.0 gallons of the 7% hydrogen peroxide solution was added immediately to the well treating fluid prior to the start of testing. This corresponds to about 0.007% by weight of hydrogen peroxide in the well treating fluid. For Sample E, 0.5 gallons of the 7% hydrogen peroxide solution was added immediately to the well treating fluid prior to the start of testing. This corresponds to about 0.035% by weight of hydrogen peroxide in the well treating fluid. For Sample F, 0.33 gallons of the 7% hydrogen peroxide solution was added immediately to the well treating fluid prior to the start of testing. This corresponds to about 0.002% by weight of hydrogen peroxide in the well treating fluid.

TABLE 2

| Time | Sample D | Sample E | Sample F |
|---|---|---|---|
| Initial | 213 | 215 | 215 |
| 1 hour | 183 | 196 | 202 |
| 2 hours | 172 | 188 | 193 |
| 4 hours | 159 | 181 | 185 |
| 6 hours | 152 | 176 | 180 |
| 18 hours | 149 | 165 | 173 |

EXAMPLE 3

A well treating fluid was produced according to the method described in Example 1 except that the 0.33 gallons of the cationic polyacrylamide emulsion sold as ""PLEXSLICK 982C," which is manufactured by Cytec Industries was added per 1000 gallons of fresh water. This corresponds with about 0.01% by weight of polyacrylamide. For sample G, 1.0 gallons of the 7% hydrogen peroxide solution was added immediately to the well treating fluid prior to the start of testing. This corresponds to about 0.007% by weight of hydrogen peroxide in the well treating fluid.

TABLE 3

| Time | Sample G |
|---|---|
| Initial | 174 |
| 1 hour | 169 |
| 2 hours | 161 |
| 4 hours | 152 |
| 6 hours | 147 |
| 18 hours | 145 |

EXAMPLE 4

A well treating fluid was produced according to the method described in Example 1 except that the 0.5 gallons of the cationic polyacrylamide emulsion sold as ""PLEXSLICK 982C," which is manufactured by Cytec Industries was added per 1000 gallons of deionized water. This corresponds with about 0.0175% by weight of polyacrylamide. For sample H, 1.0 gallons of the 7% hydrogen peroxide solution was added immediately to the well treating fluid prior to the start of testing. This corresponds to about 0.007% by weight of hydrogen peroxide in the well treating fluid.

TABLE 4

| Time | Sample H |
|---|---|
| Initial | |
| 1 hour | 192 |
| 2 hours | 185 |
| 4 hours | 176 |
| 6 hours | 151 |
| 18 hours | 147 |

As can be seen from the above examples, hydrogen peroxide in amounts ranging from about 0.002 to about 0.007 weight percent are effective at reducing the viscosity of a well treating fluid containing from about 0.01 to about 0.02 weight percent of two polyacrylamide emulsions that are commonly used in slickwater fracturing to about the viscosity of water in about 18 hours at 90° F.

The above descriptions of certain embodiments are made for the purposes of illustration only and are not intended to be limiting in any manner. Other alterations and modifications of the preferred embodiments will become apparent to those of ordinary skill in the art upon reading the disclosure, and it is intended that the scope of the invention disclosed herein be limited only by the broadest interpretation of the appended claims to which the inventors are legally entitled.

What is claimed is:

1. A method of slickwater fracturing an underground formation comprising:
   providing a well treating fluid comprising water;
   adding a polyacrylamide friction reducer in an amount of from about 0.005% to about 0.04% by weight;
   adding a viscosity breaker selected from the group consisting of hydrogen peroxide, calcium peroxide, magnesium peroxide, and zinc peroxide in an amount above about 0.002% by weight;
   injecting the well treating fluid into an underground formation at a pressure sufficient to fracture the underground formation; and
   allowing the viscosity breaker to reduce the viscosity of the well treating fluid to about that of water over a period of time.

2. The method of claim 1 wherein the viscosity breaker reduces the viscosity of the well treating fluid to about that of water within about 18 hours.

3. The method of claim 1 wherein the viscosity of the well treating fluid is reduced to about 0.79 centipoise at about 90° F.

4. The method of claim 1 that does not include the step of raising the temperature of the formation.

5. The method of claim 1 wherein the polyacrylamide is added to the well treating fluid by adding a polyacrylamide emulsion.

6. The method of claim 1 wherein the viscosity breaker is hydrogen peroxide.

7. The method of claim 1 wherein the water is fresh water.

8. The method of claim 1 wherein the water is salt water containing less than about 10% salt content.

9. The method of claim 1 further comprising adding to the well treating fluid other additives selected from the group consisting of surfactants, scale inhibitors, microbiocides, and mixtures thereof.

10. The method of claim 1 wherein the well treating fluid has an initial viscosity below about 5 centipoise at a temperature of about 90° F.

11. The method of claim 1 wherein:
the viscosity breaker is present in an amount of from about 0.002% to about 0.02% by weight;
the well treating fluid has an initial viscosity from about 0.8 to about 5 centipoise at a temperature of about 90° F.; and
the viscosity breaker reduces the viscosity of the well treating fluid to about 0.79 centipoise at about 90° F. within about 18 hours.

12. The method of claim 1 wherein the viscosity breaker is an encapsulated peroxide selected from the group consisting of calcium peroxide, magnesium peroxide and zinc peroxide.

* * * * *